G. GROVER.
AUTOMATIC AUTOMOBILE HEADLIGHT.
APPLICATION FILED DEC. 12, 1914.
1,146,619.
Patented July 13, 1915.
2 SHEETS—SHEET 2.
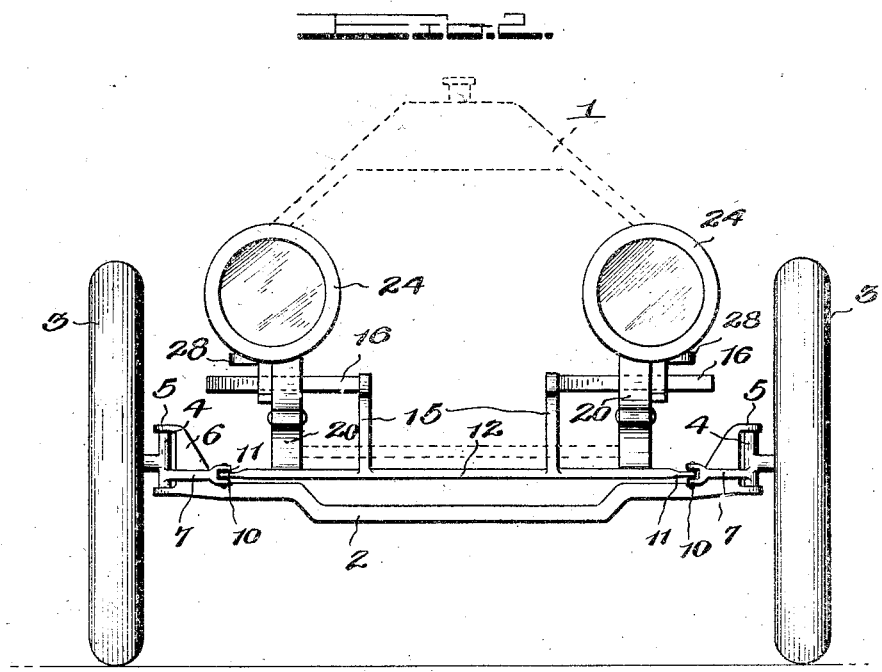
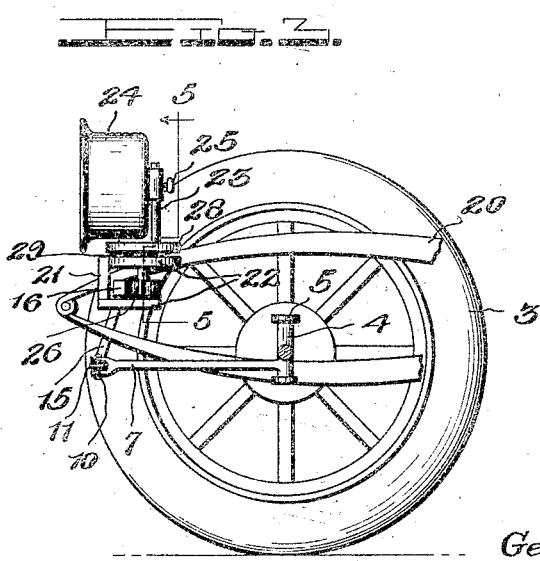
Inventor
George Grover

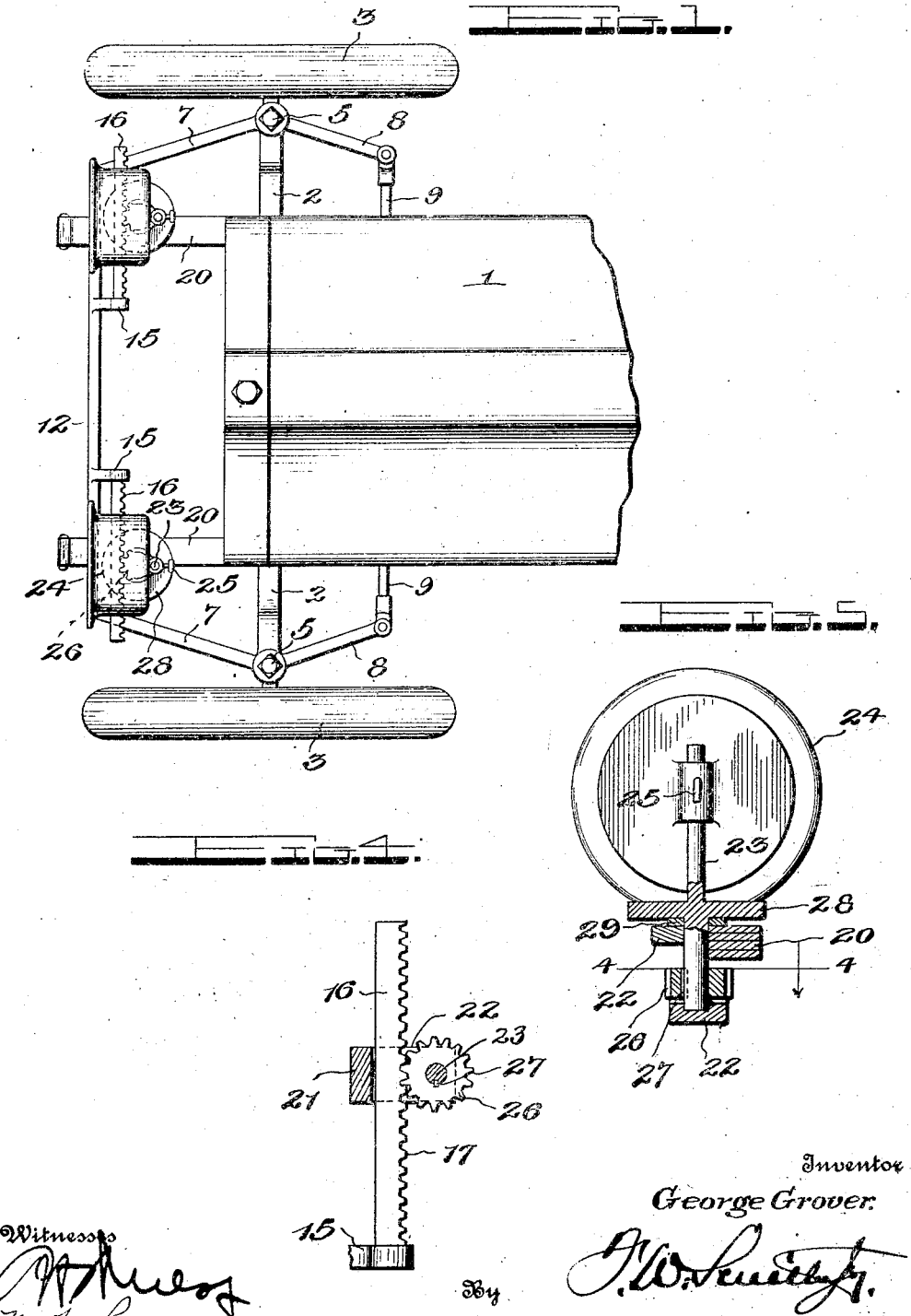

UNITED STATES PATENT OFFICE.

GEORGE GROVER, OF DANBURY, CONNECTICUT, ASSIGNOR OF ONE-HALF TO ERNEST W. SILLITOE, OF DANBURY, CONNECTICUT.

AUTOMATIC AUTOMOBILE-HEADLIGHT.

1,146,619.  Specification of Letters Patent. Patented July 13, 1915.

Application filed December 12, 1914. Serial No. 876,906.

*To all whom it may concern:*

Be it known that I, GEORGE GROVER, a citizen of the United States, residing at the city of Danbury, county of Fairfield, and State of Connecticut, have invented certain new and useful Improvements in Automatic Automobile-Headlights; and I do declare the following to be a full, clear, and exact description of the invention, such as will enable others skilled in the art to which it appertains to make and use the same.

This invention relates to certain new and useful improvements in automobile headlights, and more particularly to headlights operated by the steering mechanism of the car so that the lights will always point in the direction in which the car is moving.

The invention has for its object to provide a pair of lights which will be readily attachable to automobiles of any type and which can be attached to the vehicle springs, or at any other suitable location.

A further object of the invention is to provide an improved and novel mechanism of this type which will be automatic in its operation, and one which can be cheaply and expeditiously manufactured and assembled.

Referring to the drawings: Figure 1 is a top plan view of a portion of an automobile showing the invention in place thereon; Fig. 2 is a front elevation; Fig. 3 is a vertical sectional view of the invention; Fig. 4 is a section on the line 4—4 of Fig. 5; and Fig. 5 is a section on the line 5—5 of Fig. 3.

Referring more particularly to the drawings, the numeral 1 represents a portion of the hood of an automobile, 2 the front axle, and 3 the front wheels thereof.

The wheels are supported by steering knuckles 4 pivoted at 5 in yokes 6 on each end of the axle 2. The steering knuckles 4 each have an arm 7 projecting from the front portion thereof, the arms being convergingly arranged as depicted in Fig. 1. Projecting rearwardly from the steering knuckles are arms 8, connected by a rod 9 which latter is in operative connection with the conventional form of steering post, not here shown.

The forward ends of the forwardly projecting arms 7 are bifurcated at 10, the furcations of which are provided with alined perforations. A rod 12 has each end thereof flattened at 11, and perforated, the flattened ends being adapted to be received between the furcations of the bifurcated ends of the forwardly extending arms 7.

Extending upwardly and rearwardly from the rod 12 is a pair of arms 15 which are preferably integral with said rod 12 although they may be formed separate therefrom and detachably secured thereto. The arms 15, are spaced with relation to each other as best seen in Fig. 2. Connected to and extending at right angles, to each of the arms are rack bars 16 the rear faces of which are provided with rack teeth 17 the purpose of which will be hereinafter set forth.

Secured to the springs 20 of the automobile in any suitable manner are substantially U-shaped brackets 21, the arms 22 of which extend rearwardly and horizontally, and are provided with alining perforations that receive a vertically mounted spindle 23 or the like which constitutes a lamp support. The lamps 24 are adjustably secured near the upper ends of the vertically extending spindle by means of set screws 25.

As shown in Fig. 4, pinions 26 are keyed at 27 to the lower portions of the vertical spindles 23, which pinions engage with the teeth 17 of the rack bars 16. For the purpose of forming bearings for the vertical spindles 23, the same are provided with flanges 28, between which and the springs 20 washers 29 shown in section in Fig. 5, are inserted.

From the foregoing it will be seen that when the steering knuckles 4 are moved about the pivots 5 by means of the steering gear 9, the rod 12 will reciprocate in a horizontal plane at right angles to the longitudinal axis of the automobile. The reciprocating movement of the rod 12 moves the rack bars 16 in a horizontal plane, and by reason of their being in mesh with the pinions 26 the latter are rotated to an extent proportionate to the movement of rod 12, thus always maintaining the lights pointed in the direction in which the car is moving. The pinions 26 being keyed to the vertical spindles 23, will upon rotation of the spindles turn the lamps from right to left, according to the operation of the steering mechanism.

By reference to Fig. 4 it will be seen that the U-shaped guide 21 not only forms means for journaling the rotatable lamp support, but the vertical part thereof forms means to guidingly engage the rack bars 16 and insure their engagement with the pinions 28.

What is claimed is:

1. In combination with an automobile and the steering mechanism thereof, an arm projecting forwardly from each steering knuckle, a rod whose ends are pivoted to said arms, a pair of arms projecting upwardly and rearwardly from said rod, a rack carried by each of said arms, a pair of brackets, carried by the automobile, a lamp support rotatably mounted on each of said brackets, and a pinion secured to each of the rotatable lamp supports and meshing with the said racks, to rotate the lamp supports upon operation of the steering mechanism.

2. In combination with an automobile and the steering mechanism thereof, an arm extending forwardly from each of the steering knuckles, a rod whose ends are pivotally connected to said arms, a pair of racks carried by the rod, a pair of U-shaped brackets carried by the automobile springs and having vertical portions, forming guides for the racks, a rotatable lamp support mounted in the arms of each of said brackets, and a pinion carried by each of the lamp supports and disposed between the bracket arms and meshing with the respective rack to rotate the lamp support upon operation of the steering mechanism.

In testimony whereof I affix my signature in presence of two witnesses.

GEORGE GROVER.

Witnesses:
J. E. CONNELL,
WILSON F. MAY.